(12) United States Patent
Oh (10) Patent No.: US 7,457,212 B2
(45) Date of Patent: Nov. 25, 2008

(54) DEFECT MANAGEMENT IN DISC REPRODUCING/REWRITING SYSTEM

(75) Inventor: Ki-Hwan Oh, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 668 days.

(21) Appl. No.: 11/188,597

(22) Filed: Jul. 25, 2005

(65) Prior Publication Data

US 2006/0044978 A1      Mar. 2, 2006

(30) Foreign Application Priority Data

Aug. 10, 2004   (KR) .................. 10-2004-0062772

(51) Int. Cl.
*G11B 15/52*  (2006.01)
(52) U.S. Cl. ................. 369/47.14; 369/53.16
(58) Field of Classification Search ........... None
See application file for complete search history.

(56) References Cited

U.S. PATENT DOCUMENTS

| | | | | |
|---|---|---|---|---|
| 4,832,487 A | * | 5/1989 | Mikuriya et al. | 356/243.1 |
| 5,212,677 A | * | 5/1993 | Shimote et al. | 369/53.17 |
| 6,151,180 A | * | 11/2000 | Bang | 360/53 |
| 2006/0187800 A1 | * | 8/2006 | Ogura | 369/124.04 |

OTHER PUBLICATIONS

Korean Patent Application No. 1020020053813 to Lee et al, having Publication date of Mar. 11, 2004 (w/ English Abstract page).
Japanese Patent No. JP2003257020 to Kagawa et al., having Publication date of Sep. 12, 2003 (w/ English Abstract page).
Japanese Patent No. JP2004030852 to Iida et al., having Publication date of Jan. 29, 2004 (w/ English Abstract page).

* cited by examiner

*Primary Examiner*—Paul Huber
(74) *Attorney, Agent, or Firm*—Monica H. Choi

(57) ABSTRACT

A defect detector in a data disc system includes a defect estimation unit and a defect length counter. The defect detector inputs a RF signal from a pick-up unit for generating a defect signal. The defect length counter interprets the defect signal using a wobble signal and a header position (ESFS) signal to generate defect length information. A system controller determines which sector of the data disc has unacceptable defect from the defect length information to reassign such a sector to another available sector on the data disc.

22 Claims, 7 Drawing Sheets

DEFECT MANAGEMENT IN DISC REPRODUCING/REWRITING SYSTEM

BACKGROUND OF THE INVENTION

This application claims priority to Korean Patent Application No. 2004-62772, filed on Aug. 10, 2004, in the Korean Intellectual Property Office, the disclosure of which is incorporated herein in its entirety by reference.

1. Field of the Invention

The present invention relates generally to disc reproducing/rewriting systems, and more particularly to defect management therein for defects beyond ECC (error correction code) capability.

2. Description of the Related Art

In general, a system which reproduces/writes information from/to an optical disc such as a re-writable CD-RW, CD-MRW, DVD±R/RW, DVD-RAM, DVD+MRW and so on uses a pick-up unit to access tracks of the optical disc. Manufacturing specifications of the re-writable optical disc guarantee a predetermined number of times for repeatedly rewriting information on the optical disc.

Figure 1:
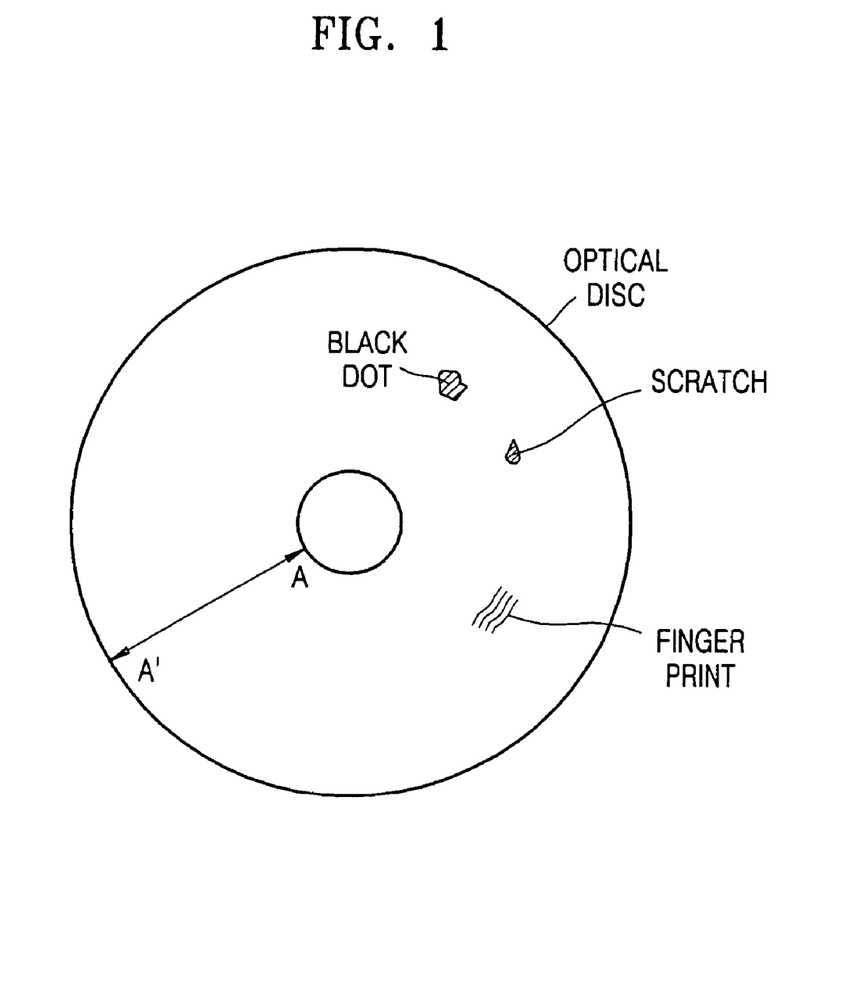
FIG. 1 shows example defects on a general re-writable optical disc.
Figure 2:
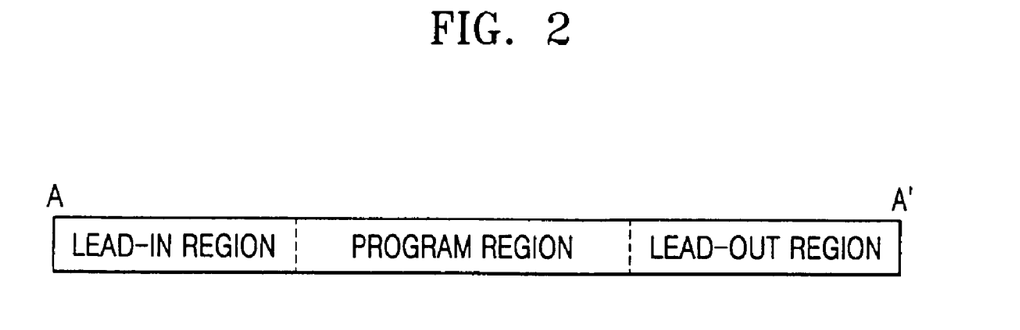
FIG. 2 shows a data structure across an area indicated by line A-A' across the optical disc in FIG. 1.

However, with repeated use of the re-writable optical disc, defects may be generated on the optical disc due to deterioration of the disc or other various reasons. Such defects may include a black dot, a scratch, a finger print, etc., as shown in FIG. 1. These defects may be generated in a lead-in region, a program region, or a lead-out region of the optical disc, shown in FIG. 2.

A defect on the optical disc may be fatal such that the defect cannot be handled by an error correction code (ECC) carried out when the optical disc is played. In that case, the optical disc should be discarded in the prior art because the disc is no longer re-writable. In the case of the re-writable optical disc such as CD-MRW and DVD+MRW, information for the start of the optical disc and information about defect management are recorded in the lead-in region. In addition, audio or video data is recorded in the program region, and information for the end of the optical disc is recorded in the lead-out region.

Generally, defects on the re-writable optical disc have been handled in the prior art by ECC which is executed when the optical disc is played. When the optical disc has a minute defect such as a black dot, scratch, or finger print, servo tracking of the pick-up unit is not performed and ECC is executed according to the RS (Reed Solomon) algorithm or the like when an RF signal output from the pick-up unit is decoded to reproduce information from the optical disc.

With increase of recording density of the optical disc, inattentive handling of the optical disc may more easily generate defects. However, a severe defect on the optical disc cannot be repaired by just ECC with suspended tracking, and in that case the optical disc system may not operate properly. Furthermore, the optical disc should be discarded in the prior art when servo tracking cannot be accurately performed even when the optical disc has insignificant defects.

Thus, a mechanism is desired for handling severe defects on the optical disc and when servo tracking is not accurately performed.

SUMMARY OF THE INVENTION

Accordingly, the present invention manages such severe defects or improper servo tracking.

In a method of managing defect on a data disc in a data disc system, a defect detector includes a defect estimation unit and a defect length counter. The defect detector inputs a RF signal from a pick-up unit for generating a defect signal by comparing the RF signal to a defect threshold. The defect length counter interprets the defect signal using a wobble signal and a header position (ESFS) signal to generate defect length information.

In one embodiment of the present invention, the defect length counter generates defect length information corresponding to each sector of the data disc. In addition, a system controller inputs the defect length information for determining which sector of the data disc has unacceptable defect from the defect length information. Furthermore, the system controller reassigns any sector with unacceptable defect to another available sector on the data disc.

In another embodiment of the present invention, the defect length information includes a defect length count, a defect length interrupt signal, and a shadow defect length count. In an example embodiment of the present invention, the defect length count depends on whether a defect is present in a header of a sector.

In a further embodiment of the present invention, the defect detector further includes a servo hold defect detection unit and a defect flag unit. The servo hold defect detection unit generates a servo hold signal by comparing the RFO signal and a hold threshold. The defect flag unit generates, from the RFO signal, at least one flag signal indicating a type of defect on the data disc.

The present invention may be used to particular advantage when the data disc system is an optical disc reproducing/rewriting system. However, the present invention may also be applied for any type of data disc system.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, 7, 8, 9, 10, and 11 refer to elements having similar structure and/or function.

DETAILED DESCRIPTION OF THE INVENTION

Figure 3:
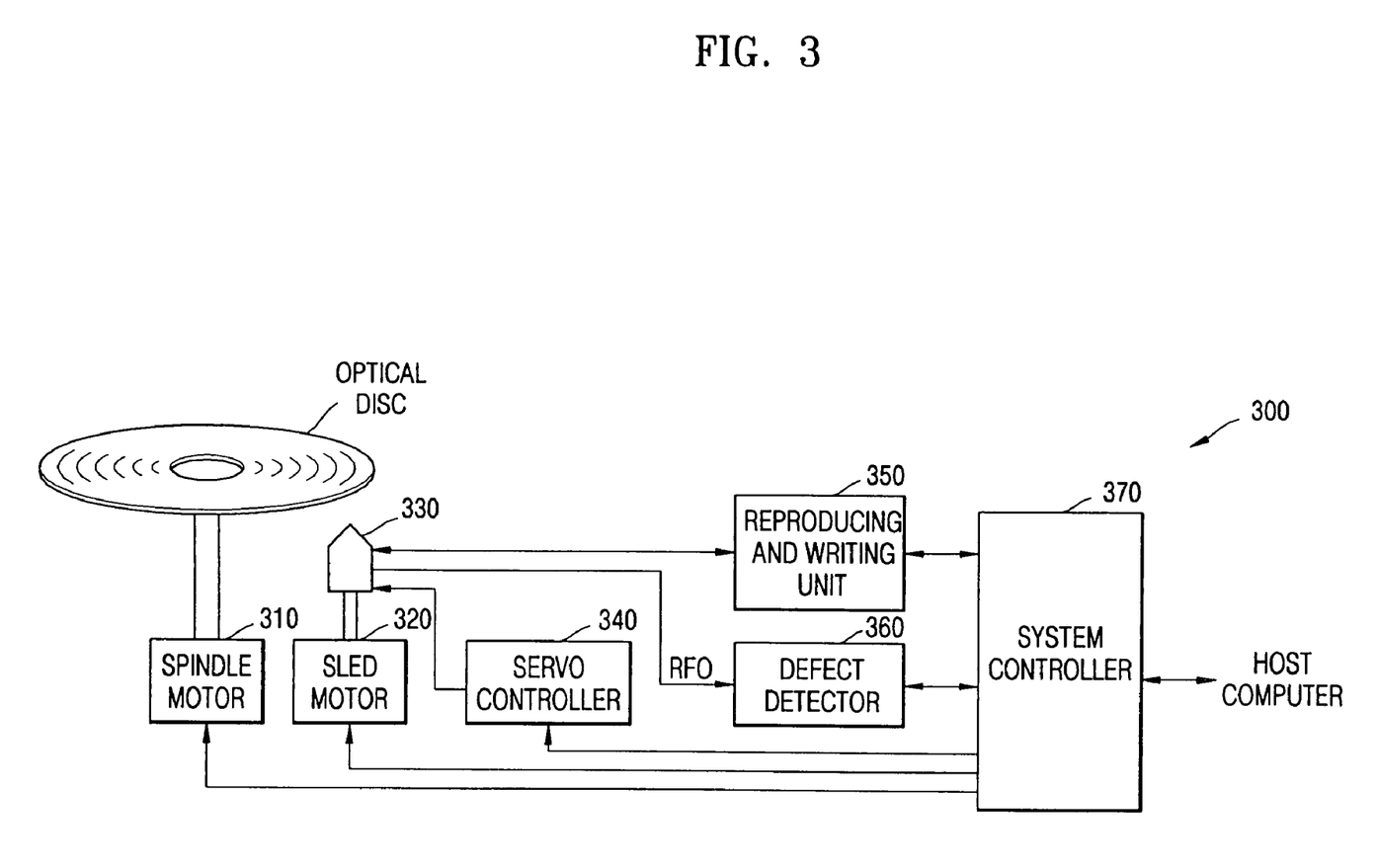
FIG. 3 is a block diagram of an optical disc reproducing/rewriting system including a defect detector according to an embodiment of the present invention.

FIG. 3 shows a block diagram of an optical disc reproducing/rewriting system 300 having a defect detector 360 according to an embodiment of the present invention. The optical disc reproducing/rewriting system 300 is an example data disc system, and the present invention may be applied for other types of data disc systems. The system 300 also includes a spindle motor 310, a sled motor 320, a pick-up unit 330, a servo controller 340, a reproducing and writing unit 350, and a system controller 370.

An optical disc is loaded on a rotating axis of the spindle motor 310 and rotated. The pick-up unit 330 is moved horizontally across the optical disc by the sled motor 320. Here, the optical disc is a re-writable disc. The pick-up unit 330 reads information recorded on the optical disc or writes encoded data on the optical disc under control of the servo controller 340. The servo controller 340 drives a tracking actuator and a focusing actuator within the pick-up unit 330. The system controller 370 controls the spindle motor 310, the sled motor 320, and the servo controller 340 for optical disc tracking.

Audio or video information is written in the form of pits on spiral tracks of the optical disc. An optical element included in the pick-up unit 330 tracks the spiral tracks to generate an RF (radio frequency) signal RFO from the information written on the optical disc. Furthermore, the pick-up unit 330 receives encoded data from the reproducing and writing unit 350 and processes the encoded data to drive a laser diode for writing the encoded data in the form of pits on the tracks of the optical disc.

The reproducing and writing unit 350 decodes the RF signal RFO to generate reproduced data and outputs the reproduced data to the system controller 370. In addition, the reproducing and writing unit 350 receives data to be written from the system controller 370 to generate the encoded data. The system controller 370 is interfaced with a host computer to transmit the reproduced data to the host computer or to receive data to be written from the host computer. Furthermore, the system controller 370 determines a sector defect state of the optical disc to carry out tracking control and optical disc sector management.

When a severe defect beyond ECC capability is found on a sector of the optical disc while data is being reproduced or written, the present invention reassigns the defective sector to another available sector. The defect detector 360 processes the RF signal RFO generated by the pick-up unit 330 to generate signals for servo hold and for information regarding defect length. The system controller 370 determines the sector defect state of the optical disc using the signals from the defect detector 360 to carry out tracking control and optical disc sector management.

The system controller 370 controls the overall operation of the optical disc reproducing/rewriting system 300 using a tracking error signal and a mirror signal extracted from the RF signal RFO. In addition, the reproducing and writing unit 350 carries out decoding and encoding operations for ECC. Such operations by the system controller 370 and the reproducing and writing unit 350 are individually known to one of ordinary skill in the art, and a detailed explanation of such operations are omitted herein. Here, a basic constituent unit for ECC is a sector of the optical disc.

Figure 4:
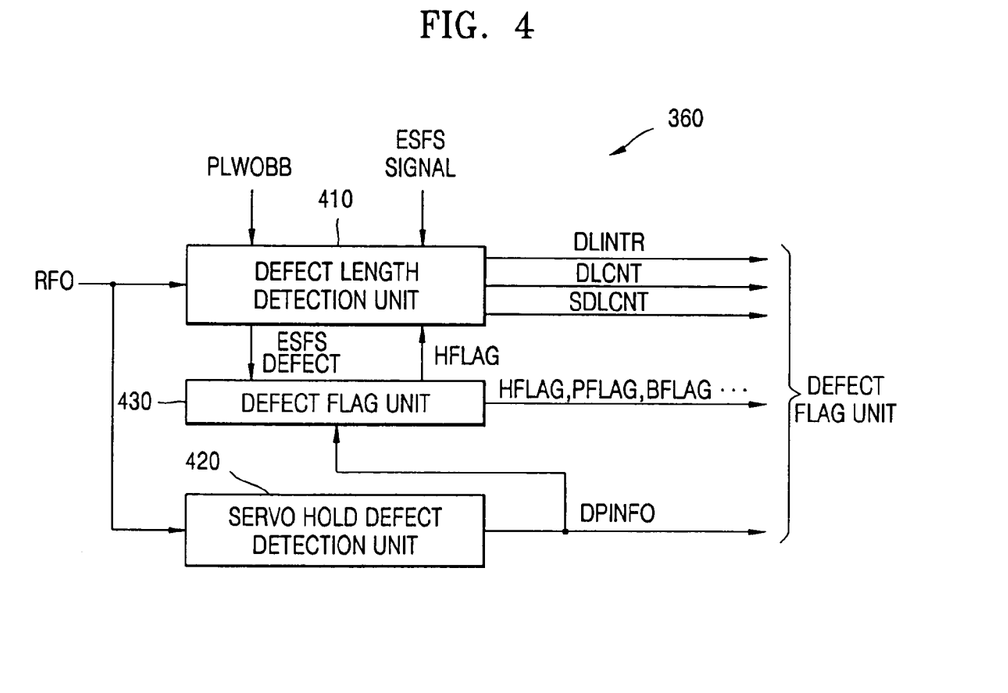
FIG. 4 is a block diagram of the defect detector of FIG. 3, according to an embodiment of the present invention.

FIG. 4 shows a block diagram of the defect detector 360 for generating the signals for servo hold and information about defect length from the RF signal RFO, according to one embodiment of the present invention. Referring to FIG. 4, the defect detector 360 includes a defect length detection unit 410, a servo hold defect detection unit 420, and a defect flag unit 430.

The defect length detection unit 410 generates a defect signal DEFECT from the RF signal RFO received from the pick-up unit 330. Furthermore, the defect length detection unit 410 interprets the defect signal DEFECT using a wobble signal PLWOBB and an ESFS (encoder subcode frame sync) signal to generate defect length information signals DLINTR, DLCNT, and SDLCNT. The ESFS signal indicates the positions of sectors on the optical disc. The defect length detection unit 410 will be explained in more detail with reference to FIG. 5.

The servo hold defect detection unit 420 generates a hold signal DPINFO for servo hold from the RF signal RFO. A hold threshold HDTHR for servo hold and a defect detection threshold FDTHR for extracting the defect signal DEFECT will be explained with reference to FIG. 6. The defect flag unit 430 generates flag information signals related to defects detected by the defect length detection unit 410. In addition, the defect flag unit 430 generates a flag information signal related to defects detected by the servo hold defect detection unit 420 from the hold information signal DPINFO.

The flag information signals related to defects detected by the defect length detection unit 410 include a header flag signal HFLG and a current state flag signal PFLG. The header flag signal HFLAG indicates whether the header of a sector has a defect. When the header of the sector has a defect, the header flag signal HFLAG is activated from a first logic state (logic low state) to a second logic state (logic high state). The current state flag signal PFLAG indicates whether a track of the optical disc that is currently tracked has a defect. When such a track has a defect, the current state flag signal is activated from the first logic state (logic low state) to the second logic state (logic high state).

The flag information signal related to defects detected by the servo hold defect detection unit 420 includes a black dot/scratch flag signal BFLAG. The black dot/scratch flag signal BFLAG indicates whether the track that is currently tracked has a black dot or scratch. When such a track has a defect, the black dot/scratch flag signal BFLAG is activated from the first logic state (logic low state) to the second logic state (logic high state).

As described above, the defect detector 360 processes the RF signal RFO to generate the defect signal DEFECT, the hold information signal DPINFO, the defect length information signals DLINTR, DLCNT and SDLCNT, and the flag information signals HFLAG, PFLAG and BFLAG. Accordingly, the system controller 370 determines the sector defect state of the optical disc using the defect length information signals DLINTR, DLCNT and SDLCNT, the flag information signals HFLAG, PFLAG and BFLAG, and the hold information signal DPINFO. Based on the determination result, the system controller 370 holds tracking of the pick-up unit 330, or when a sector of the optical disc has a severe defect beyond ECC capability, the system controller 370 reassigns the defective sector to another available sector.

Figure 5:
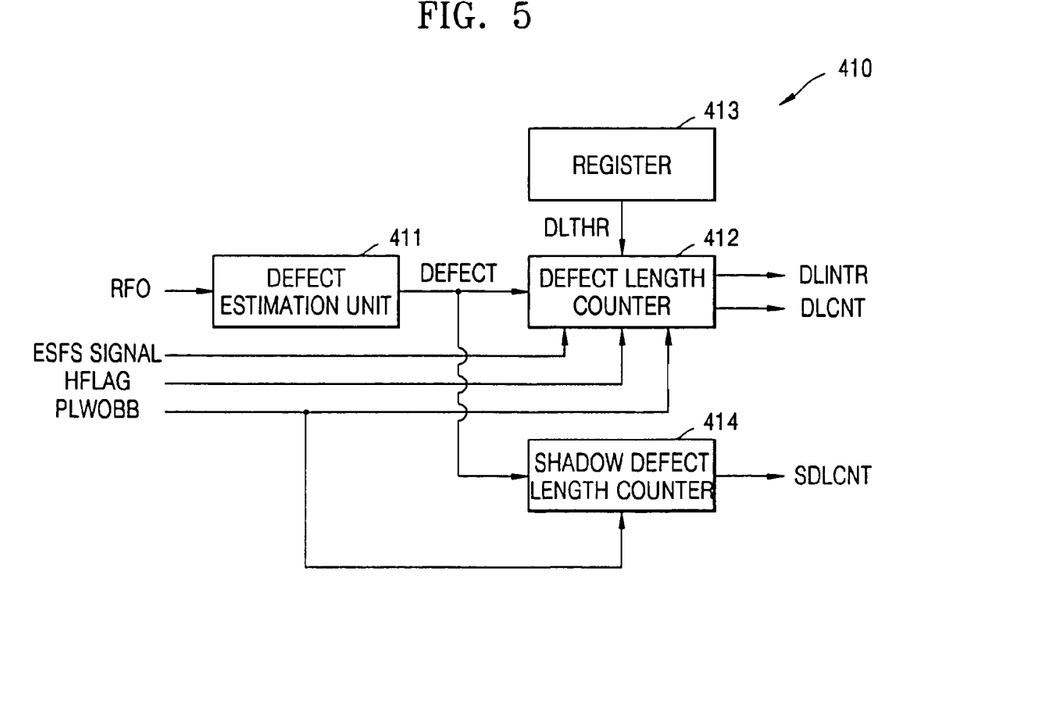
FIG. 5 is a block diagram of the defect length detection unit of FIG. 4, according to an embodiment of the present invention.

FIG. 5 is a block diagram of the defect length detection unit 410. Referring to FIG. 5, the defect length detection unit 410 includes a defect estimation unit 411, a defect length counter 412, a register 413, and a shadow defect length counter 414.

The operation of the defect length detection unit 410 will be explained with reference to FIGS. 8, 9 and 10.

The defect estimation unit 411 generates the defect signal DEFECT that is activated when a signal obtained by filtering the RF signal RFO is lower than the defect threshold FDTHR. When the RF signal RFO is filtered in order to obtain the defect signal DEFECT, the magnitude of the filtered signal is proportional to the quantity of laser beam reflected from the optical disc to the pick-up unit 330.

Figure 6:
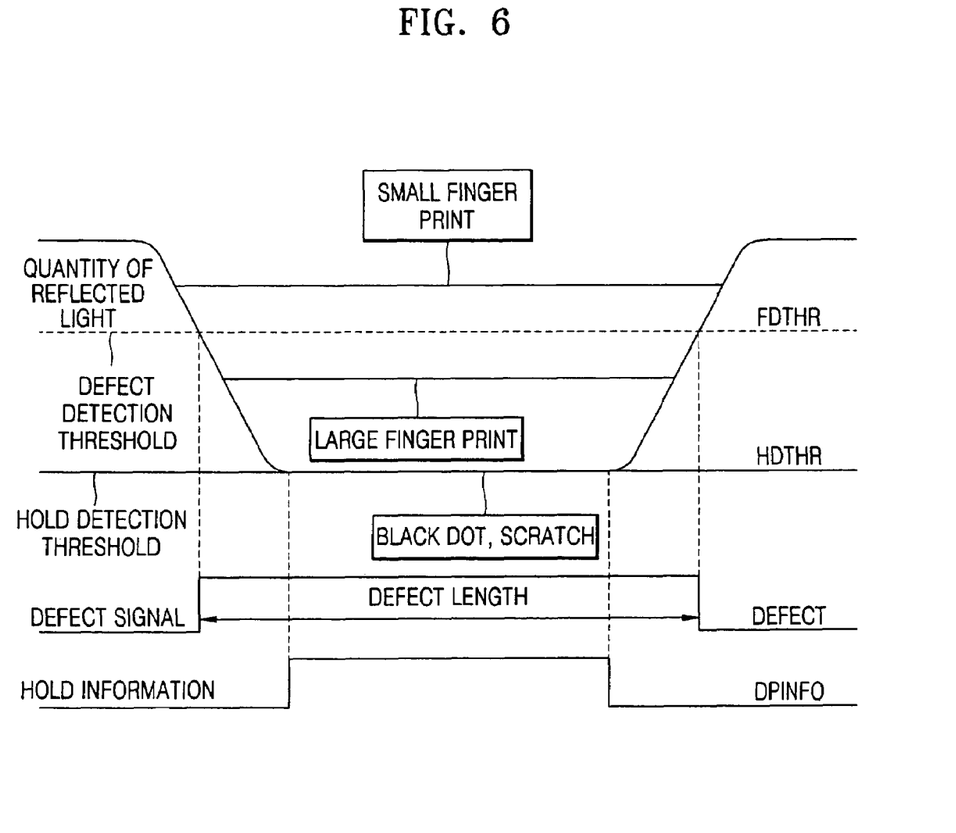
FIG. 6 shows a plot of the quantity of reflected light according to defect types.

FIG. 6 shows a plot of the quantity of reflected light according to defect types. For example, the defect signal DEFECT is activated when the signal obtained by filtering the RF signal RFO is lower than the defect threshold FDTHR. In FIG. 4, the servo hold defect detection unit 420 generates the hold information signal DPINFO that is activated when the signal obtained by processing the RF signal RFO is lower than the hold threshold HDTHR.

Referring to FIG. 6, the hold threshold HDTHR for servo tracking hold is lower than the defect threshold FDTHR for appropriate sector management. When the quantity of reflected light becomes very small due to a black dot or scratch encountered during tracking, tracking is held and ECC is carried out in general. ECC is not performed for the quantity of reflected light corresponding to a considerably large finger print. However, even if the signal obtained by processing the RF signal RFO is higher than the hold threshold HDTHR but lower than the defect threshold FDTHR, a defect may not be processed by ECC according to its length in the present invention. Thus, the present invention is proposed to manage defects beyond ECC capability.

The defect length counter 412 processes the defect signal DEFECT to generate the defect length count signal DLCNT. The defect length counter 412 also generates the defect length interrupt signal DLINTR that is activated when the defect length count signal DLCNT is higher than a defect length threshold DLTHR. Here, the defect length count signal DLCNT is reset when the defect length interrupt signal DLINTR is activated. The defect length threshold DLTHR is stored in the register 413. The shadow defect length counter 414 processes the defect signal DEFECT for a previous sector to generate the shadow defect length count signal SDLCNT.

Figure 7:
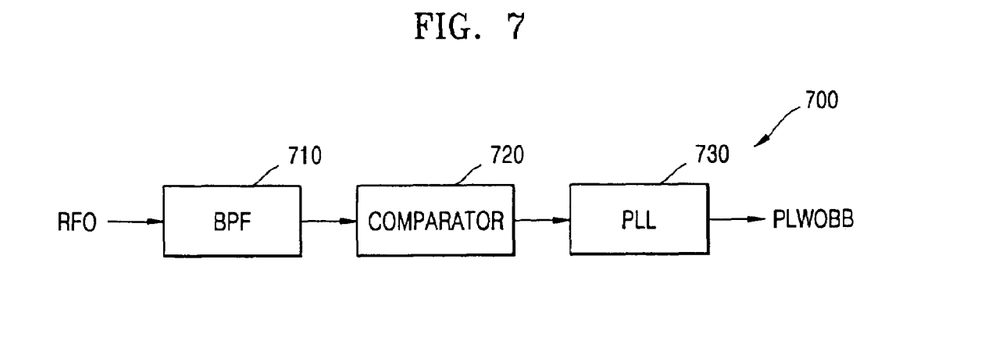
FIG. 7 is a block diagram of a wobble signal generator for generating a PLWOBB signal in FIG. 4, according to an embodiment of the present invention.

The defect length counter 412 and the shadow defect length counter 414 use the wobble signal PLWOBB that is phase-locked by a PLL (phase locked loop). A wobble signal generator 700 is shown in FIG. 7 for generating the wobble signal PLWOBB. The operation of the wobble signal generator 700 is now explained.

The wobble signal generator 700 includes a band pass filter 710, a comparator 720, and a PLL 730. The band pass filter 710 removes noise from the RF signal RFO generated by the pick-up unit 330 to generate a signal with a frequency band corresponding to the wobble signal PLWOBB. The comparator 720 converts the output signal of the band pass filter 710 into a binary digital signal. The PLL 730 locks the frequency of the output signal of the comparator 720 to output the wobble signal PLWOBB.

The wobble signal PLWOBB has a unique frequency for every optical disc. The generated wobble signal is used by the system controller 370 as position information of the track that is currently tracked. The wobble signal PLWOBB also serves as a basic signal for generating a timing clock signal used for reproducing or writing data. Additionally, the wobble signal PLWOBB is used by the defect length counter 412 and the shadow defect length counter 414 for counting with the defect signal DEFECT to generate the count signals DLCNT and SDLCNT. For example, cycles of the wobble signal PLWOBB are counted while the defect signal DEFECT is activated to generate the count signals DLCNT and SDLCNT.

The operation of the defect detector 360 of FIG. 3 is now explained in more detail. FIG. 8 is a timing diagram during operation of the defect detector 360 when the header of a sector has no defect. FIG. 9 is a timing diagram when the header of the current sector has a defect, and FIG. 10 is a timing diagram when the header of a next sector has a defect. The operation of the defect detector 360 is described with reference to FIGS. 8, 9, and 10 and the flow chart of FIG. 11.

Figure 8:
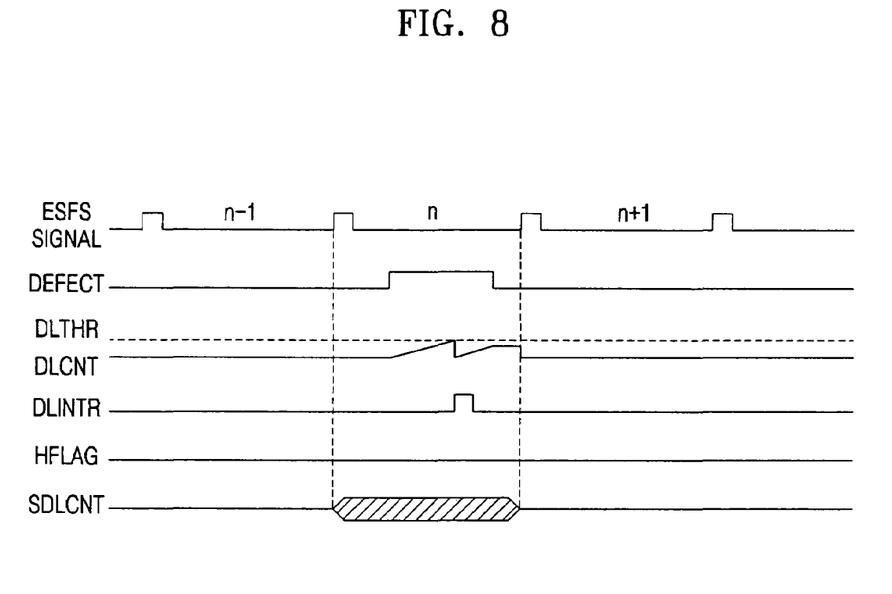
FIG. 8 is a timing diagram during operation of the defect detector of FIG. 3 when the header of a current sector has no defect, according to an embodiment of the present invention.
Figure 9:
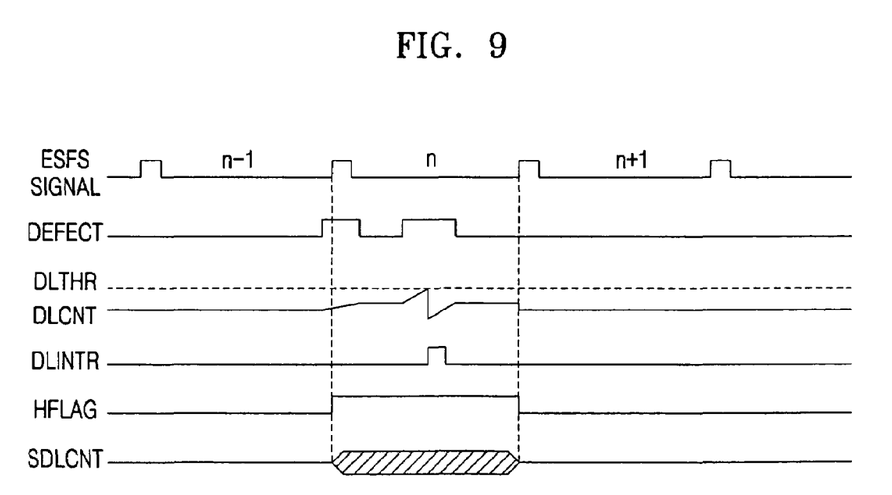
FIG. 9 is a timing diagram during operation of the defect detector of FIG. 3 when the header of the current sector has a defect, according to an embodiment of the present invention.
Figure 11:
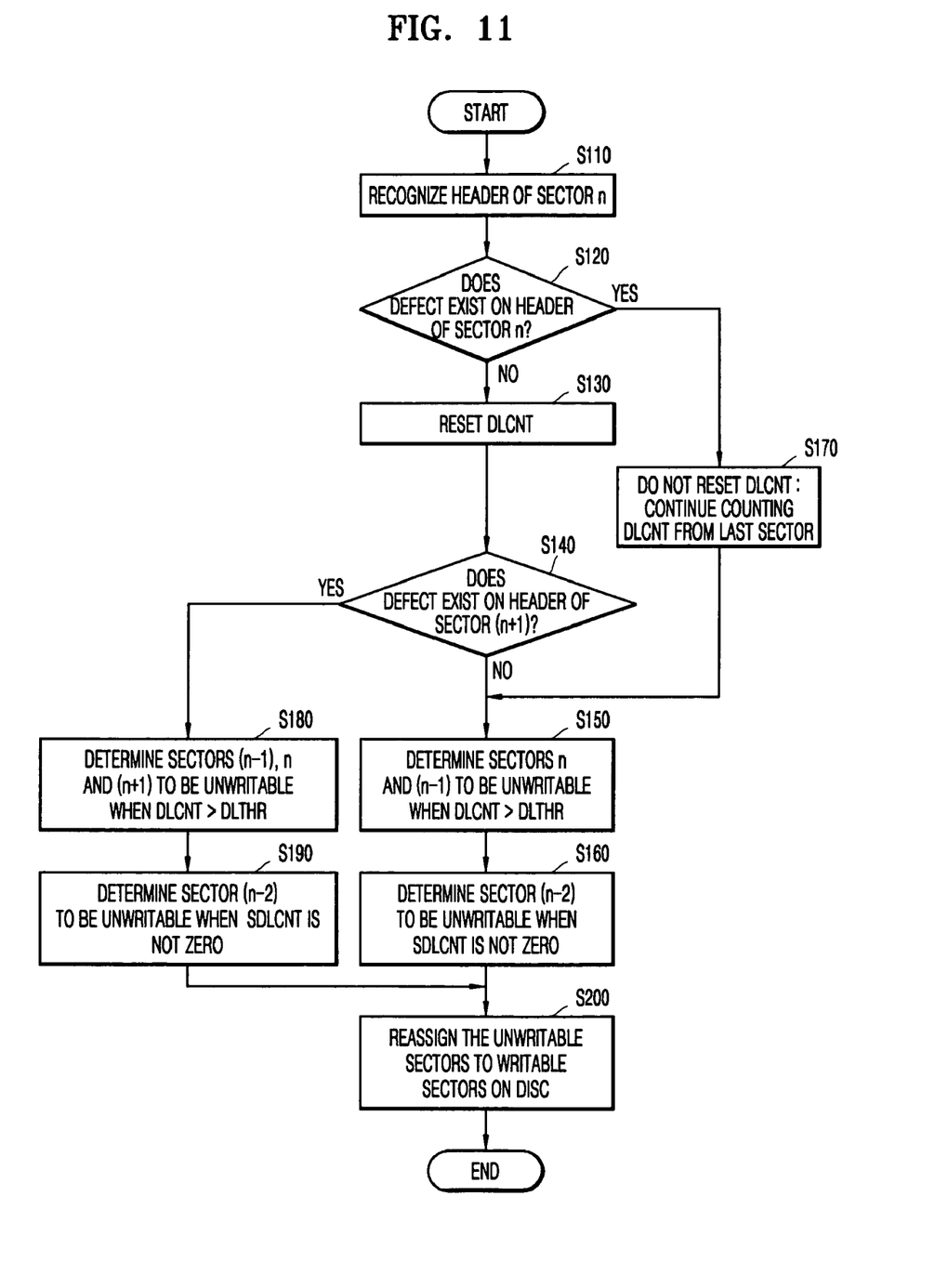
FIG. 11 is a flow chart of steps during operation of the defect detector of FIG. 3, according to an embodiment of the present invention.

Referring to FIGS. 5 and 8, the defect length counter 412 recognizes the position of the header of the current sector n (step S110 of FIG. 11). The reproducing and writing unit 350 processes the RF signal RFO to generate the ESFS signal. The system controller 370 recognizes the sector of the current tracking position according to the ESFS signal. The trigger position of the ESFS signal corresponds to the sector header position. The header flag signal HFLAG generated by the defect flag unit 430 indicates whether the header of the current sector n has a defect (step S120 of FIG. 11). The defect flag unit 430 activates the header flag signal HFLAG to the second logic state when the defect signal DEFECT is activated during the sector header position.

When the header of the current sector n has no defect (as shown in FIG. 8), the defect length counter 412 resets the defect length count signal DLCNT at the sector header position (step S130 of FIG. 11). The defect length counter 412 activates the defect length interrupt signal DLINTR when the defect length count signal DLCNT is higher than the defect length threshold. The defect length counter 412 resets the defect length count signal DLCNT when the defect length interrupt signal DLINTR is activated. If the header of the current sector n has a defect (as shown in FIG. 9), the defect length counter 412 does not reset the defect length count signal DLCNT and continues counting the DLCNT from the last sector (step S170 of FIG. 11)

Then, the defect length counter 412 determines whether the header of the next sector (n+1) has a defect in response to the header flag signal (step S140 of FIG. 11). When the header of the next sector (n+1) has no defect, the defect length counter 412 resets the defect length count signal DLCNT and carries out the same operation on the sector (n+1) as the operation performed on the sector n.

In addition, the defect length interrupt signal DLINTR is activated for the current sector n when DLCNT is greater than DLTHR. Moreover in that case, the system controller 370 determines the current sector n and the previous sector (n−1) to be unwritable sectors (step S180 of FIG. 11) and reassigns such unwritable sectors n and (n−1) to other available sectors (step S200 of FIG. 11).

Here, the previous sector (n−1) is determined to be an unwritable sector in addition to the current sector n in consideration of scrambling or descrambling of data of the current sector and data of the neighboring sector when CIRC (cross interleaved Reed-Solomon code) interleaving is carried out during an ECC process according to the RS (Reed Solomon) algorithm. That is, another sector is reassigned also for the sector (n−1) because information of the sector (n−1) is not available when the current sector n has a defect.

Additionally, the system controller 370 determines reassignment of another sector for a sector (n−2) prior to the previous sector (n−1) in response to the shadow defect length count signal SDLCNT generated by the shadow defect length counter 414 (step S190 of FIG. 11). If the previous sector (n−1) has a defect as indicated by SDLCNT, the sector (n−2) is also determined to be an unwritable sector in consideration of CIRC interleaving and another sector is reassigned for the sector (n−2) (step S200 of FIG. 11).

Figure 10:
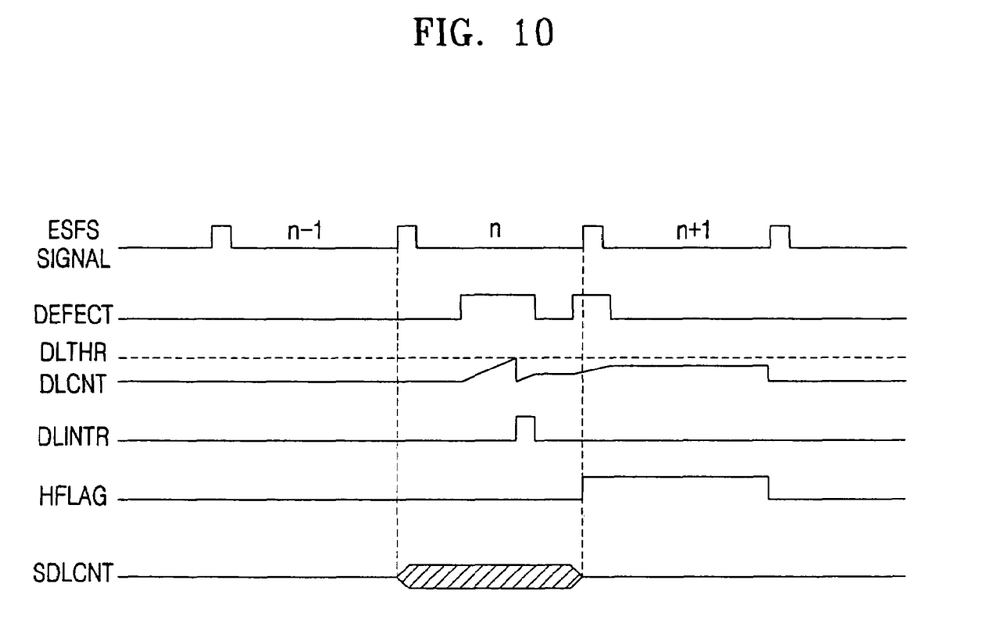
FIG. 10 is a timing diagram during operation of the defect detector of FIG. 3 when the header of a next sector has a defect, according to an embodiment of the present invention.

FIG. 10 shows a case where the defect signal DEFECT is continuously accumulated for the current sector n, the defect length interrupt signal DLINTR is activated for the current sector n, and the header of the next sector (n+1) has a defect. When the defect length interrupt signal DLINTR is activated for the current sector n and the header of the next sector (n+1) has a defect, the system controller 370 determines the previous sector (n−1), the current sector n, and the next sector (n+1) to be unwritable sectors (step S150 of FIG. 11) and reassigns other available sectors to replace such sectors (n−1), n, and (n+1) (step S200 of FIG. 11).

Furthermore, the system controller 370 decides reassignment of another sector for the previous sector (n−2) in response to the shadow defect length count signal SDLCNT generated by the shadow defect length counter 414 (step S160 of FIG. 11). If the previous sector (n−1) has a defect as indicated by SDLCNT, the sector (n−2) is also determined to be an unwritable sector in consideration of CIRC interleaving and another available sector is reassigned for the sector (n−2) (step S200 of FIG. 11).

In this manner, the optical disc reproducing/re-writing system 300 according to the present invention includes the defect detector 360 that generates the information signals DPINFO, DLINTR, DLCNT, SDLCNT, HFLAG, PFLAG and BFLAG related to types and lengths of defects on the optical disc. The system controller 370 controls servo hold in response to such signals and reassigns available sectors for sectors having defects beyond ECC capability. Thus, the optical disc may be used longer even with defects. Furthermore, the present invention may provide stabilized optical disc tracking control because servo tracking hold and sector reassignment are efficiently carried out during writing and reproducing operations.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of managing defect on a data disc, comprising:
generating an RF signal from reading the data disc;
generating a defect signal by comparing the RF signal to a defect threshold; and
interpreting the defect signal using a wobble signal and a header position (ESFS) signal to generate defect length information.

2. The method of claim 1, further comprising:
generating defect length information corresponding to each sector of the data disc; and
determining which sector of the data disc has unacceptable defect from the defect length information.

3. The method of claim 2, further comprising:
reassigning any sector with unacceptable defect to another available sector on the data disc.

4. The method of claim 1, wherein the defect length information includes a defect length count, a defect length interrupt signal, and a shadow defect length count.

5. The method of claim 4, wherein the defect length count depends on whether a defect is present in a header of a sector.

6. The method of claim 1, further comprising:
generating a servo hold signal by comparing the RFO signal and a hold threshold; and
generating, from the RFO signal, at least one flag signal indicating a type of defect on the data disc.

7. The method of claim 1, wherein the data disc is part of an optical disc reproducing/rewriting system.

8. A defect length detector in a data disc system, comprising:
a defect estimation unit that inputs an RF signal for generating a defect signal by comparing the RF signal to a defect threshold; and
a defect length counter that interprets the defect signal using a wobble signal and a header position (ESFS) signal to generate defect length information.

9. The defect length detector of claim 8, wherein the defect length counter generates defect length information corresponding to each sector of the data disc.

10. The defect length detector of claim 9, wherein the defect length counter transmits the defect length information to a system controller that determines which sector of the data disc has unacceptable defect from the defect length information.

11. The defect length detector of claim 10, wherein the system controller reassigns any sector with unacceptable defect to another available sector on the data disc.

12. The defect length detector of claim 8, wherein the defect length information includes a defect length count, a defect length interrupt signal, and a shadow defect length count.

13. The defect length detector of claim 8, wherein the defect length count depends on whether a defect is present in a header of a sector.

14. The defect length detector of claim 8, wherein the data disc system is an optical disc reproducing/rewriting system.

15. A data disc system, comprising:
a data disc;
a pick-up unit for generating an RF signal from reading the data disc; and
a defect detector including:
a defect estimation unit that inputs the RF signal for generating a defect signal by comparing the RF signal to a defect threshold; and
a defect length counter that interprets the defect signal using a wobble signal and a header position (ESFS) signal to generate defect length information.

16. The data disc system of claim 15, wherein the defect length counter generates defect length information corresponding to each sector of the data disc.

17. The data disc system of claim 16, further comprising:
a system controller that inputs the defect length information for determining which sector of the data disc has unacceptable defect from the defect length information.

18. The data disc system of claim 17, wherein the system controller reassigns any sector with unacceptable defect to another available sector on the data disc.

19. The data disc system of claim 15, wherein the defect length information includes a defect length count, a defect length interrupt signal, and a shadow defect length count.

20. The data disc system of claim 19, wherein the defect length count depends on whether a defect is present in a header of a sector.

21. The data disc system of claim 15, wherein the defect detector further includes:
a servo hold defect detection unit for generating a servo hold signal by comparing the RFO signal and a hold threshold; and
a defect flag unit for generating, from the RFO signal, at least one flag signal indicating a type of defect on the data disc.

22. The data disc system of claim 21, wherein the data disc system is an optical disc reproducing/rewriting system.

* * * * *